United States Patent
Qiu et al.

(10) Patent No.: US 10,558,918 B2
(45) Date of Patent: Feb. 11, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Xule Qiu, Yokohama (JP); Hiroshi Okamoto, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 922 days.

(21) Appl. No.: 14/918,915

(22) Filed: Oct. 21, 2015

(65) Prior Publication Data

US 2016/0335545 A1    Nov. 17, 2016

(30) Foreign Application Priority Data

May 14, 2015  (JP) ................. 2015-099520

(51) Int. Cl.
  *G06N 7/00* (2006.01)
  *G06N 5/02* (2006.01)

(52) U.S. Cl.
  CPC ............. *G06N 5/022* (2013.01); *G06N 7/005* (2013.01)

(58) Field of Classification Search
  CPC ..... G06N 5/022; G06N 7/005; H04L 67/1044
  See application file for complete search history.

(56) References Cited

U.S. PATENT DOCUMENTS

| | | | |
|---|---|---|---|
| 7,975,035 B2 * | 7/2011 | Popescu | H04L 69/329 709/200 |
| 2002/0186382 A1 | 12/2002 | Gonzalez et al. | |
| 2004/0036923 A1 | 2/2004 | Kokemohr et al. | |

(Continued)

FOREIGN PATENT DOCUMENTS

| | | |
|---|---|---|
| JP | 2003-030216 A | 1/2003 |
| JP | 2010-004229 A | 1/2010 |
| JP | 2013-196070 A | 9/2013 |

OTHER PUBLICATIONS

Dunbar et al., "Implicit and explicit training in the mitigation of cognitive bias through the use of a series game", Computers in Human Behavior 37 (2014)307-318 (Year: 2014).*

(Continued)

*Primary Examiner* — Li B. Zhen
*Assistant Examiner* — Tsu-Chang Lee
(74) *Attorney, Agent, or Firm* — Oliff PLC

(57) ABSTRACT

An information processing apparatus includes: a network information acquisition unit that acquires network information which includes target nodes and adjacent nodes; a classification ratio calculation unit that calculates a classification ratio, in which the target nodes are respectively classified as a plurality of communities corresponding to a predetermined number in the network information, so as to have correlation according to given resolutions with a classification ratio in which the adjacent nodes are respectively classified as the plurality of communities; a first type community generation unit that generates one or more first type communities; a classification ratio updating unit that updates the classification ratio relevant to the target nodes so as to have correlation with the classification ratio in which the adjacent nodes are respectively classified as the plurality of communities; and a second type community generation unit that generates one or more second type communities.

6 Claims, 8 Drawing Sheets

(56) References Cited

U.S. PATENT DOCUMENTS

2005/0213119 A1     9/2005   Clark et al.
2010/0321434 A1    12/2010  Baba
2014/0009796 A1     1/2014   Kajiwara et al.

OTHER PUBLICATIONS

Lancichinetti, et al., "Detecting the overlapping and hierarchical community structure in complex networks", New Journal of Physics 11(2009)033015 (Year: 2009).*

Fortunato et. al., "Community detection in graphs", Physics Reports 486(2010)75-174 (Year: 2010).*

Sep. 8, 2016 Office Action issued in Australian Patent Application No. 2015268671.

Apr. 25, 2016 extended Search Report issued in European Patent Application No. 16153080.3.

Lancichinetti, A. et al., "Detecting the overlapping and hierarchical community structure in complex networks," Mar. 11, 2009, pp. 1-20, retrieved from arXiv.org.

Arenas, A. et al., "Analysis of the structure of complex networks at different resolution levels," Jan. 15, 2008, pp. 1-25, retrieved from arXiv.org.

* cited by examiner

FIG. 8

| $p(C^{(1)}_k, C^{(2)}_l)$ | | |
|---|---|---|
| | l=1 | l=2 |
| k=1 | 0.324 | 0 |
| k=2 | 0.296 | 0 |
| k=3 | 0 | 0.38 |

| $p(C^{(2)}_l)$ | |
|---|---|
| l=1 | 0.62 |
| l=2 | 0.38 |

| $p(C^{(1)}_k \mid C^{(2)}_l)$ | | |
|---|---|---|
| | l=1 | l=2 |
| k=1 | 0.523 | 0 |
| k=2 | 0.477 | 0 |
| k=3 | 0 | 1 |

FIG. 9

| $p(C^{(2)}_k, C^{(3)}_l)$ | |
|---|---|
| | l=1 |
| k=1 | 0.62 |
| k=2 | 0.38 |

| $p(C^{(3)}_l)$ | |
|---|---|
| l=1 | 1 |

| $p(C^{(2)}_k \mid C^{(3)}_l)$ | |
|---|---|
| | l=1 |
| k=1 | 0.62 |
| k=2 | 0.38 |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-099520 filed on May 14, 2015.

BACKGROUND

1. Technical Field

The present invention relates to an information processing apparatus and a non-transitory computer readable medium.

2. Related Art

In the related art, there is a case in which so-called community (cluster) decomposition is performed on vector-type data, and thus global features are analyzed. There is a case in which the community decomposition is performed on network-type data which includes a link that connects nodes.

SUMMARY

An aspect of the present invention provides an information processing apparatus including: a network information acquisition unit that acquires network information which includes target nodes and adjacent nodes which are connected through links; a classification ratio calculation unit that calculates a classification ratio, in which the target nodes are respectively classified as a plurality of communities corresponding to a predetermined number in the network information, so as to have correlation according to given resolutions with a classification ratio in which the adjacent nodes are respectively classified as the plurality of communities; a first type community generation unit that generates one or more first type communities, to which the target nodes belong, in the network information based on the classification ratio which is relevant to the target nodes and which is calculated according to a first value of the resolutions; a classification ratio updating unit that updates the classification ratio relevant to the target nodes so as to have correlation according to a second value of the resolutions with the classification ratio in which the adjacent nodes are respectively classified as the plurality of communities; and a second type community generation unit that generates one or more second type communities, to which the target nodes belong, in the network information based on the classification ratio which is relevant to the target nodes and which is updated by the classification ratio updating unit.

BRIEF DESCRIPTION OF THE DRAWINGS

Exemplary embodiment(s) of the present invention will be described in detail based on the following figures, wherein:

FIG. 8 is a table illustrating the dependence degree between a first hierarchical community and a second hierarchical community, which is calculated by the information processing apparatus according to the embodiment of the present invention; and FIG. 9 is a table illustrating the dependence degree between the second hierarchical community and a third hierarchical community, which is calculated by the information processing apparatus according to the embodiment of the present invention.

DETAILED DESCRIPTION

Hereinafter, an exemplary embodiment of the present invention will be described with reference to the accompanying drawings.

Figure 1:
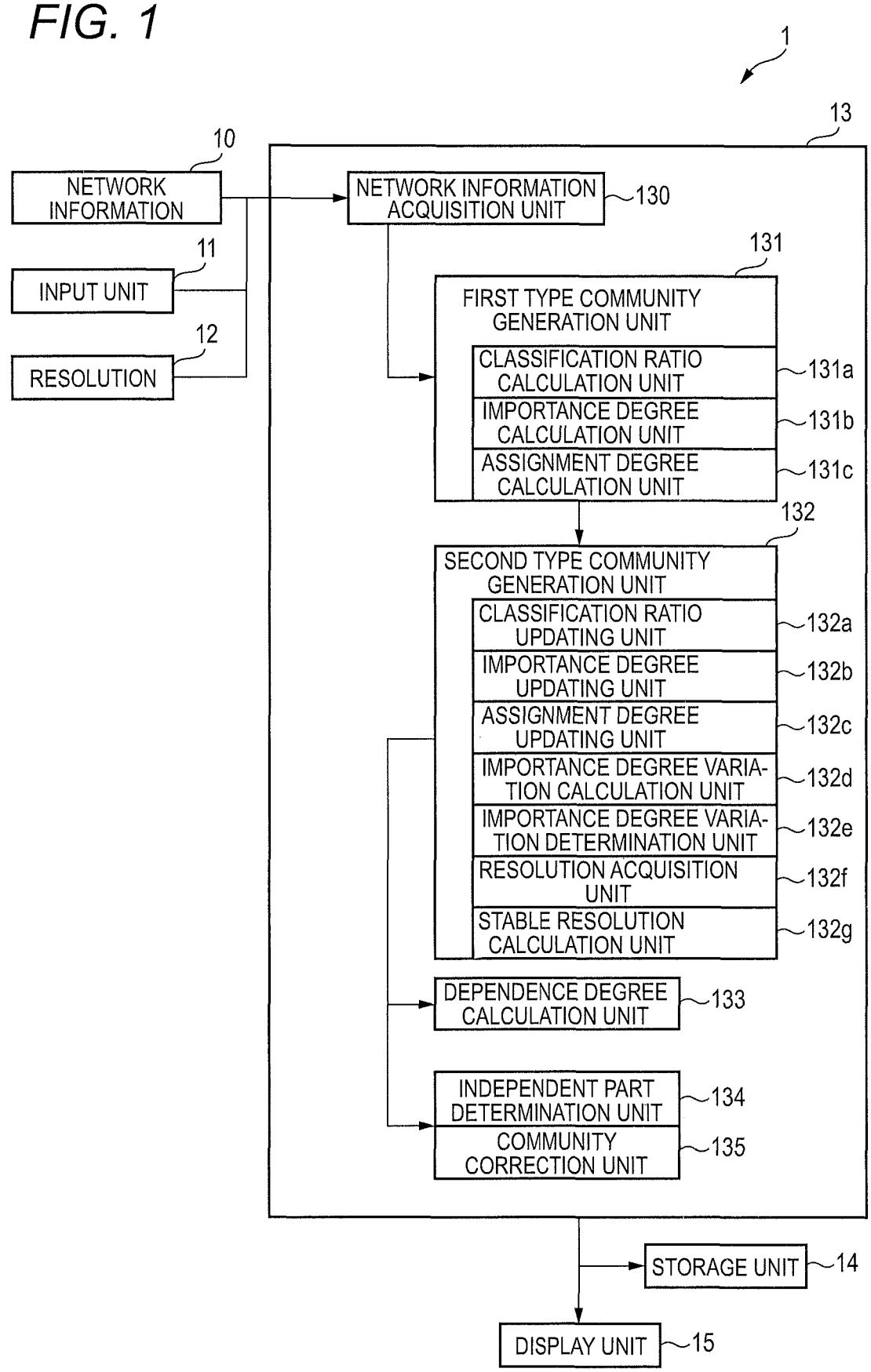
FIG. 1 is a functional block diagram illustrating an information processing apparatus according to an embodiment of the present invention.

FIG. 1 is a functional block diagram illustrating an information processing apparatus 1 according to an embodiment of the present invention. An information processing apparatus 1 acquires network information 10 and resolution 12, and includes an input unit 11, a control unit 13, a storage unit 14, and a display unit 15.

The storage unit 14 includes, for example, a random access memory (RAM) or a read only memory (ROM). The storage unit 14 stores a program which is executed by the control unit 13, and functions as the work memory of the control unit 13. Meanwhile, the program, which is stored in the storage unit 14 and is executed by the control unit 13, may be provided through an electrical communication line or may be provided after being stored in an information storage medium, such as a semiconductor storage element, which is readable by a computer.

The network information 10 includes a target node and adjacent nodes which are connected through link. The network information 10 includes a plurality of nodes and a plurality of links which connect the plurality of nodes, and one of the plurality of nodes is the target node. The network information 10 may be, for example, HTML data which include cross reference, data corresponding to the positional relationship of an organization, data corresponding to friendship, or the like. The network information 10 may indicate at least connection relationship (relationship between a node and a link) between the nodes or may indicate the detailed content (the content of the HTML data or the like) which is included in the node.

The input unit 11 includes, for example, a keyboard, a mouse, or the like, and transmits an instruction of a user to the control unit 13. The resolution 12 is a positive real number, and is a parameter which is used to determine the size of a community when the community classification is performed on the network information 10 by the information processing apparatus 1.

The control unit 13 includes, for example, a Central Processing Unit (CPU), and controls the entirety of the information processing apparatus 1 by executing the program which is stored in the storage unit 14. The control unit 13 functionally includes a network information acquisition unit 130, a first type community generation unit 131, a second type community generation unit 132, a dependence degree calculation unit 133, an independent part determination unit 134, and a community correction unit 135. Here, the first type community generation unit 131 includes a classification ratio calculation unit 131a, an importance degree calculation unit 131b, and an assignment degree calculation unit 131c. In addition, the second type community generation unit 132 includes a classification ratio updating unit 132a, an importance degree updating unit 132b, an assignment degree updating unit 132c, an importance degree variation calculation unit 132d, an importance degree variation determination unit 132e, a resolution acquisition unit 132f, and a stable resolution calculation unit 132g. Control performed by the control unit 13 will be described later in detail.

The storage unit 14 includes, for example, a random access memory (RAM) or a read only memory (ROM). The storage unit 14 stores the program which is executed by the control unit 13, and functions as the work memory of the control unit 13. Meanwhile, the program, which is stored in the storage unit 14 and is executed by the control unit 13, may be provided through an electrical communication line, or may be provided after being stored in an information storage medium, such as a semiconductor storage element, which is readable by a computer. The display unit 15 displays information, which is processed by the control unit 13, to the user, and includes, for example, a liquid crystal display device.

Meanwhile, the network information 10 and the resolution 12 may be input using the input unit 11 by the user, may be stored in the storage unit 14, or may be provided through the electrical communication line.

Figure 2:
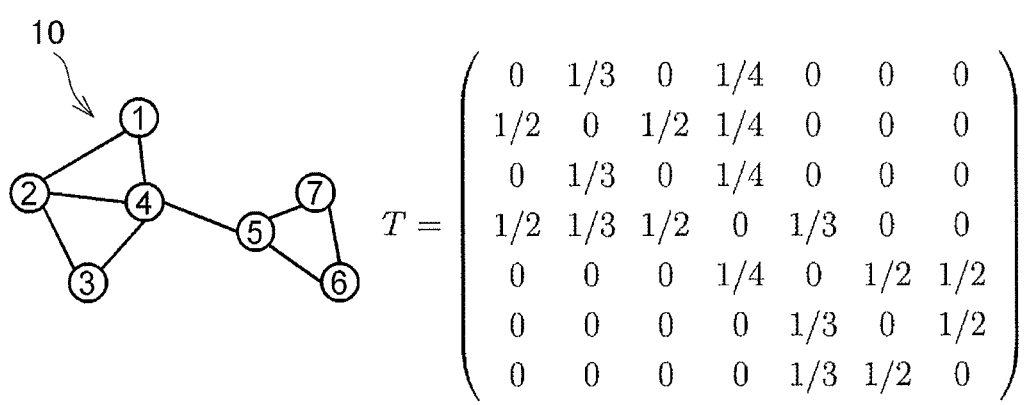
FIG. 2 is a diagram illustrating an example of network information which is acquired by the information processing apparatus according to the embodiment of the present invention.

FIG. 2 is a diagram illustrating an example of the network information 10 which is acquired by the information processing apparatus 1 according to the embodiment of the present invention. The network information 10 of the example includes information about seven nodes and nine links. Node numbers 1 to 7 are attached to the respective nodes, and, for example, a node corresponding to a node number 1 (hereinafter, expressed as a node [1]) has links of a node [2] and a node [4]. In the embodiment, a case of a network which has seven nodes is illustrated for concise description. However, the number of nodes and the number of links may be larger than the above description, and may be, for example, approximately a hundred thousand. In the network information 10 of the example, a link which connects nodes does not have a direction. However, the link may have a one way direction.

A matrix T indicates a transition probability acquired when random transition is performed between nodes along links. For example, when transition is performed randomly from the node [1] as a starting point to another node along links, the transition is performed to the node [2] with a ½ probability, and transition is performed to the node [4] with a ½ probability. A first column of the matrix T indicates the transition probabilities in a lump. Other matrix elements are formed in the same manner. Generally, when the total number of nodes is set to N, the matrix T is defined using the following Equation 1 using a matrix A in which $A_{nm}=1$ when a node [n] is connected to a node [m] through a link and $A_{nm}=0$ when the node [n] is not connected to the node [m] through the link. Since the total sum of the transition probabilities is 1, $\Sigma_n T_{nm}=1$ with regard to an arbitrary node [m].

$$T_{nm} = \frac{A_{nm}}{\Sigma_{s=1}^{N} A_{sm}} \quad \text{[Equation 1]}$$

Figure 3:
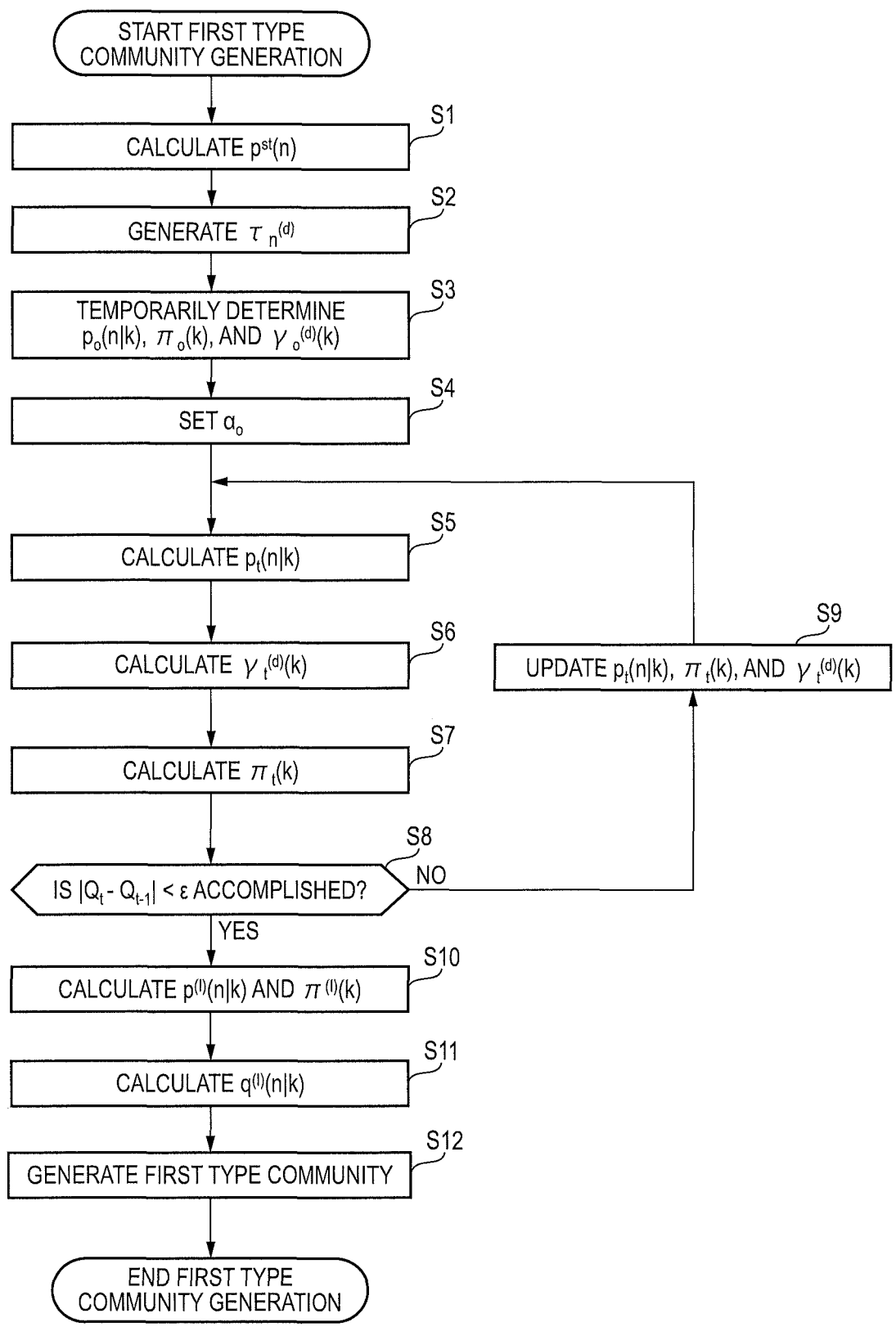
FIG. 3 is a flowchart illustrating the generation of first type communities in the information processing apparatus according to the embodiment of the present invention.

FIG. 3 is a flowchart illustrating the generation of first type communities in the information processing apparatus 1 according to the embodiment of the present invention. In a process of generating the first type communities, the network information 10 and the resolution 12 are input, and N nodes, which are included in the network, are classified as a plurality of communities corresponding to a number which is equal to or less than K. Here, N and K are positive integers. In addition, the information processing apparatus 1 according to the embodiment generates the communities such that one node is classified as a plurality of communities. Meanwhile, the total number K of the components is a parameter which can be temporarily determined by the user, and it is possible to set such that, for example, K=N. However, as will be described later, the total number of communities is automatically determined when the first type communities are generated. When the first type communities are generated, a classification ratio, in which a plurality of nodes are respectively classified as the corresponding communities with regard to the plurality of respective communities, is acquired, and the importance degrees of the plurality of communities are acquired. That is, with regard to the community [k], a classification ratio p(n|k), in which the node [n] is classified as a community [k], is acquired and the importance degree π(k) of the community [k] is acquired. When the classification ratio p(n|k) and the importance degree π(k) are acquired, and the ratio $\gamma^{(d)}(k)$, which the community [k] occupies to the entirety of the plurality of communities, is acquired based on d-th passage information $\tau^{(d)}$. Here, the d-th passage information $\tau^{(d)}$ is an N-dimensional vector, and includes D data such as $\tau^{(1)}, \tau^{(2)} \ldots \tau^{(D)}$ (D is a positive integer).

In the process of generating the first type communities, first, stationary probability distribution $p^{st}(n)$ is calculated when transition is randomly performed between the nodes of the network, which are indicated by the network information 10 (S1). The stationary probability distribution $p^{st}(n)$ is acquired by solving an N-th degree simultaneous equation which is defined using the following Equation 2. The stationary probability distribution $p^{st}(n)$ is the unique vector of the matrix T and has a unique value of 1.

$$p^{st}(n) = \sum_{m=1}^{N} T_{nm} p^{st}(m) \quad \text{[Equation 2]}$$

When a problem, such as so-called rank sink, is concerned and there is a problem in that the value of the stationary probability distribution is focused on a specific node, the stationary probability distribution $p^{st}(n)$ may be acquired by changing Equation 2 and using, for example, a relation in which $p^{st}(n)=(1-r)\Sigma_m T_{nm} p^{st}(m)+r$. Here, r is a real number which is equal to or larger than 0 and is equal to or less than 1. r indicates a probability in which transition is randomly performed between nodes not along the links.

Subsequently, a plurality of pieces of passage information $\tau_n^{(d)}$, which indicates nodes passing when the transition is randomly performed between the plurality of nodes along the plurality of links, is generated (S2). In the embodiment, the pieces of passage information is generated in such a way that $\tau_n^{(d)}=1$ for the node [n] which is selected according to the stationary probability distribution $p^{st}(n)$ and $\tau_m^{(d)}=1$ for the node [m] which is selected according to $T_{mn}$ for applying a probability in which transition is performed into the node [m] from the node [n] as a starting point. The N-dimensional vector is generated D times. The passage information $T_n^{(d)}$ is the amount which satisfies $\Sigma_n \tau_n^{(d)}=2$. When the virtual agent performs random transition along links between the nodes, the passage information $\tau_n^{(d)}$ indicates a case in which the virtual agent is detected on the link which connects the node [n] to the node [m].

The classification ratio calculation unit 131a and the importance degree calculation unit 131b according to the embodiment respectively calculate the classification ratio $p(n|k)$ and the importance degree $\pi(k)$ through sequential computation. The classification ratio calculation unit 131a calculates a classification ratio, in which the target nodes are respectively classified as the plurality of communities corresponding to the predetermined number in the network information 10, such that the classification ratio has correlation according to the given resolution 12 with a classification ratio in which the adjacent nodes connected to the target nodes through links are respectively classified as the plurality of communities. When sequential computation starts, $p_0(n|k)$, $\pi_0(k)$, and $\gamma_0^{(d)}(k)$ are temporarily determined (S3). Here, it is assumed that values, which satisfy $\Sigma_n p_0(n|k)=1$ and $\Sigma_k \pi_0(k)=1$, are given. Since $p_0(n|k)$ indicates a ratio in which the components of k=1 to K are classified as the nodes of n=1 to N, K×N−1 positive real numbers are given in the temporary determination. In addition, since $\pi_0(k)$ indicates the importance degree for the communities, which are classified as k=1 to K, in the network, K−1 positive real numbers are given in the temporary determination. Since $\gamma_0^{(d)}(k)$ is a coefficient which indicates a ratio, which the community [k] occupies to the entirety of the plurality of communities, and a coefficient, which is determined in accordance with the passage information $\tau^{(d)}$ of d=1 to D, K×D positive real numbers, are given in the temporary determination.

In addition, the classification ratio calculation unit 131a and the importance degree calculation unit 131b according to the embodiment set the resolution 12 to the first value $\alpha_0$ as a parameter which is used to determine the size of the community of the network (S4). Here, although $\alpha_0$ is a value which can be freely determined by the user, it is preferable that the value is set such that sufficiently minute classification is performed on the communities of the network information 10. Since the value of the resolution 12 is equal to or larger than 0, it is preferable that a value which is close to 0 is set as $\alpha_0$.

In the first step of the sequential computation, a classification ratio $p_t(n|k)$ is calculated by performing t-th sequential computation (S5). Here, t is a positive integer and indicates the number of times of the sequential computation. $p_t(n|k)$ is calculated using $p_{t-1}(n|k)$, $\pi_{t-1}(k)$, and $\gamma_{t-1}^{(d)}(k)$, which are acquired by performing immediately before sequential computation. For example, in the first sequential computation which is performed after the temporary determination (S3), $p_1(n|k)$ is acquired using $p_0(n|k)$, $\pi_0(k)$, and $\gamma_0^{(d)}(k)$.

The classification ratio calculation unit 131a according to the embodiment calculates the classification ratio $p_t(n|k)$ by performing the t-th sequential computation according to relationship which is determined in the following Equation 3 (S5).

$$p_t(n|k) = \frac{\alpha_0}{\alpha_0 + 2D_{t-1}(k)} \sum_{m=1}^{N} T_{nm} p_{t-1}(m|k) + \frac{1}{\alpha_0 + 2D_{t-1}(k)} \sum_{d=1}^{D} \gamma_{t-1}^{(d)}(k) \tau_n^{(d)} \quad \text{[Equation 3]}$$

Here, $\alpha_0$ is the resolution 12 which is set in S4 and is a positive real number. In the embodiment, the resolution 12 is a parameter in which the particle size of the resolution becomes small as $\alpha_0$ is close to 0 and the particle size of the resolution becomes coarse as $\alpha_0$ is close to infinity. In addition, $D_{t-1}(k)$ is a coefficient which is determined based on $\gamma_{t-1}^{(d)}(k)$ and $D_{t-1}(k)=\Sigma_d \gamma_{t-1}^{(d)}(k)$.

The classification ratio $p_t(n|k)$ is calculated based on a value which includes a first contribution (first term on the right side), which becomes large as a classification ratio $p_{t-1}(m|k)$ relevant to the community [k] of the node (node [m] in which $T_{nm} \neq 0$) having a link to the node [n] is large, and a second contribution (second term on the right side) which becomes large as a ratio $\gamma_{t-1}^{(d)}(k)$, which the community [k] occupies to the entirety of the plurality of communities, is high.

In addition, the first contribution is determined based on a first coefficient $\alpha_0/(\alpha_0+2D_{t-1}(k))$, which is close to 1 when the resolution 12 becomes coarse ($\alpha_0$ is close to infinity), and a classification ratio $p_{t-1}(m|k)$ which is calculated immediately before with regard to the node (node [m] in which $T_{nm} \neq 0$) having a link to the node [n]. In addition, the second contribution is determined based on a second coefficient $1/(\alpha_0+2D_{t-1}(k))$, which is close to 0 when the resolution 12 becomes coarse ($\alpha_0$ is close to infinity), the plurality of pieces of passage information $\tau_n^{(d)}$, and the ratio $\gamma_{t-1}^{(d)}(k)$ which the community [k] occupies to the entirety of the plurality of communities. Meanwhile, as illustrated below, the ratio $\gamma_{t-1}^{(d)}(k)$, which the community [k] occupies to the entirety of the plurality of communities, is calculated based on the classification ratio $p_{t-1}(n|k)$ and the importance degree $\pi_{t-1}(k)$ which are calculated immediately before.

Subsequently, a ratio $\gamma_t^{(d)}(k)$, which the community [k] occupies to the entirety of the plurality of communities, is calculated based on the classification ratio $p_{t-1}(n|k)$, the importance degree $\pi_{t-1}(k)$, and the plurality of pieces of passage information $\tau_n^{(d)}$ which are calculated immediately before (S6). In the embodiment, the ratio $\gamma_t^{(d)}(k)$ is calculated using the following Equation 4. The ratio $\gamma_t^{(d)}(k)$ is a value which is large for a community having a relatively high importance degree in the entire communities.

$$\gamma_t^{(d)}(k) = \frac{\pi_{t-1}(k) \Pi_{n=1}^{N} (p_{t-1}(n|k))^{\tau_n^{(d)}}}{\sum_{j=1}^{K} \left( \pi_{t-1}(j) \Pi_{m=1}^{N} (p_{t-1}(m|j))^{\tau_m^{(d)}} \right)} \quad \text{[Equation 4]}$$

Further, the importance degree $\pi_t(k)$ of the community [k] of the network is calculated (S7). The importance degree $\pi_t(k)$ is calculated to be a value which is large as the ratio $\gamma_t^{(d)}(k)$, which the community [k] occupies to the entirety of the plurality of communities, is high. The importance degree calculation unit 131b calculates the importance degree $\pi_t(k)$ of one community [k] of the plurality of communities using the classification ratio $p_{t-1}(n|k)$, which is calculated by the classification ratio calculation unit 131a, such that the importance degree $\pi_t(k)$ becomes a value which is large as the ratio $\gamma_t^{(d)}(k)$, which the one community [k] occupies to the entirety of the plurality of communities, is high. In the embodiment, the importance degree $\pi_t(k)$ of the community [k] is calculated using the following Equation 5.

$$\pi_t(k) = \frac{D_{t-1}(k)}{\sum_{j=1}^{K} D_{t-1}(j)}, \qquad \text{[Equation 5]}$$

$$D_{t-1}(k) = \sum_{d=1}^{D} \gamma_{t-1}^{(d)}(k)$$

The classification ratio $p_t(n|k)$, the importance degree $\pi_t(k)$, and the ratio $\gamma_t^{(d)}(k)$ are calculated based on the classification ratio $p_{t-1}(n|k)$, the importance degree $\pi_{t-1}(k)$, the ratio $\gamma_{t-1}^{(d)}(k)$, and the passage information $\tau_n^{(d)}$ which are calculated immediately before using the above Equations 3, 4, and 5.

In the process of generating the first community, it is determined whether or not the absolute value $|Q_t-Q_{t-1}|$ of the difference in estimation values $Q_t$, acquired before and after the sequential computation, is smaller than a predetermined reference value $\varepsilon$, and it is determined whether or not to end the sequential computation (S8). In the embodiment, the estimation value $Q_t$ indicates the amount which is determined in the following Equation 6.

$$Q_t = \sum_{k=1}^{K}\sum_{d=1}^{D} \gamma_t^{(d)}(k)\log(\pi_t(k)) + \sum_{k=1}^{K}\sum_{n=1}^{N}\left(\sum_{d=1}^{D}\gamma_t^{(d)}(k)\tau_n^{(d)} + \alpha_0\sum_{m=1}^{N} T_{nm} p_t(m|k)\right)\log(p_t(n|k)) \qquad \text{[Equation 6]}$$

When $|Q_t-Q_{t-1}|<\varepsilon$ is not formed, the latest classification ratio $p_t(n|k)$, the importance degree $\pi_t(k)$, and the ratio $\gamma_t^{(d)}(k)$ are updated with the classification ratio, the importance degree and the ratio which are acquired immediately before (S9). Thereafter, a series of steps including a step in which a classification ratio $p_{t+1}(n|k)$ is calculated (S5), a step in which a ratio $\gamma_{t+1}^{(d)}(k)$ is calculated (S6), a step in which an importance degree $\pi_{t+1}(k)$ is calculated (S7) are performed, and a step in which it is determined whether or not $|Q_{t+1}-Q_t|<\varepsilon$ is established (S8) are repeated. The classification ratio calculation unit 131a and the importance degree calculation unit 131b according to the embodiment repeat the above steps until the absolute value of the difference in estimation values is smaller than the predetermined value, and calculate the classification ratio and the importance degree through the sequential computation. Therefore, the classification of the communities of the network information 10 is asymptotically performed.

In contrast, when $|Q_t-Q_{t-1}|<\varepsilon$ is established, the classification ratio, in which the node [n] is classified as the community [k], is determined based on $p^{(I)}(n|k)=p_t(n|k)$, and the importance degree of the community [k] is determined based on $\pi^{(I)}(k)=\pi_t(k)$ (S10). Here, the index (I) indicates that the value is used to generate the first type communities. In the information processing apparatus 1 according to the embodiment, when the predetermined value $\varepsilon$ is adjusted, the classification ratio $p^{(I)}(n|k)$ and the importance degree $\pi^{(I)}(k)$ are acquired with an arbitrary precision, and thus the classification is performed on the communities of the network with the arbitrary precision. Meanwhile, the number of times of the sequential computation is predetermined, and the values of $p_t(n|k)$ and $\pi_t(k)$, which are acquired when the sequential computations corresponding to the determined number of times are performed, may be respectively determined as the classification ratio $p^{(I)}(n|k)$ and the importance degree $\pi^{(I)}(k)$.

Subsequently, the assignment degree calculation unit 131c calculates an assignment degree such that each of the plurality of nodes becomes a large value as the classification ratio $p(n|k)$, in which the node [n] is classified as the community [k], is large (S11). In the embodiment, an assignment degree $q^{(I)}(k|n)$, in which the node [n] belongs to the community [k], is acquired through the following Equation 7.

$$q^{(I)}(k|n) = \frac{\pi^{(I)}(k)p^{(I)}(n|k)}{\sum_{j=1}^{K} \pi^{(I)}(j)p^{(I)}(n|j)} \qquad \text{[Equation 7]}$$

As being read based on Equation 7, the assignment degree $q(k|n)$ is the amount which satisfies $\Sigma_k q(k|n)=1$. That is, the total sum of the assignment degrees, in which a certain node belongs to each of the communities, is 1. The assignment degree $q(k|n)$ is the amount which is acquired by relatively measuring a degree, in which the certain node [n] belongs to the community [k], with regard to the entirety of the communities.

The first type community generation unit 131 generates one or more first type communities, to which the target node [n] belongs, in the network information 10 based on the classification ratio $p^{(I)}(n|k)$, which is related to the target node [n] and which is calculated to have correlation according to the first value $\alpha_0$ of the resolution 12 (S12). The first type community generation unit 131 may determine the ratio, in which the target node [n] belongs to the community [k], based on the value of the classification ratio $p^{(I)}(n|k)$. In addition, the first type community generation unit 131 may generate the first type communities, to which the target node [n] belongs, based on the assignment degree $q^{(I)}(k|n)$ which is calculated based on the classification ratio $p^{(I)}(n|k)$ and the importance degree $\pi^{(I)}(k)$. I this case, the ratio, in which the target node [n] belongs to the community [k], is determined based on the value of the assignment degree $q^{(I)}(k|n)$. In all the cases, the first type community generation unit 131 generates two or more first type communities to which the target node [n] belongs. Therefore, in the first type community generation unit 131 according to the embodiment, community classification, which expresses a case in which one node includes a plurality of attributes, is performed.

As described above, the first type community generation unit 131 according to the embodiment generates the first type communities through the sequential computation. The precision of the sequential computation is determined by $\varepsilon$ in Equation 6. When $\varepsilon$ is not set to a sufficiently small value, there is a case in which a communities having independent parts are generated. The independent part determination unit 134 according to the embodiment determines whether or not at least one of the one or more first type communities includes the two or more independent parts before updating is performed by the classification ratio updating unit 132a. Here, the independent parts, which are included in the communities, correspond to a set of the nodes. The nodes which are included in the set are directly connected to each other through links. However, nodes, which are included in the communities but are not included in the set, correspond to a set which is not directly connected through links.

When the independent part determination unit 134 determines that at least one of the one or more first type communities includes the two or more independent parts, the community correction unit 135 according to the embodiment corrects the one or more first type communities such that the two or more independent parts become two or more first type communities. Therefore, even when the communities are generated with a relatively coarse precision, the equivalent classification results are acquired as in a case in which the communities are generated with a higher precision.

Figure 4:
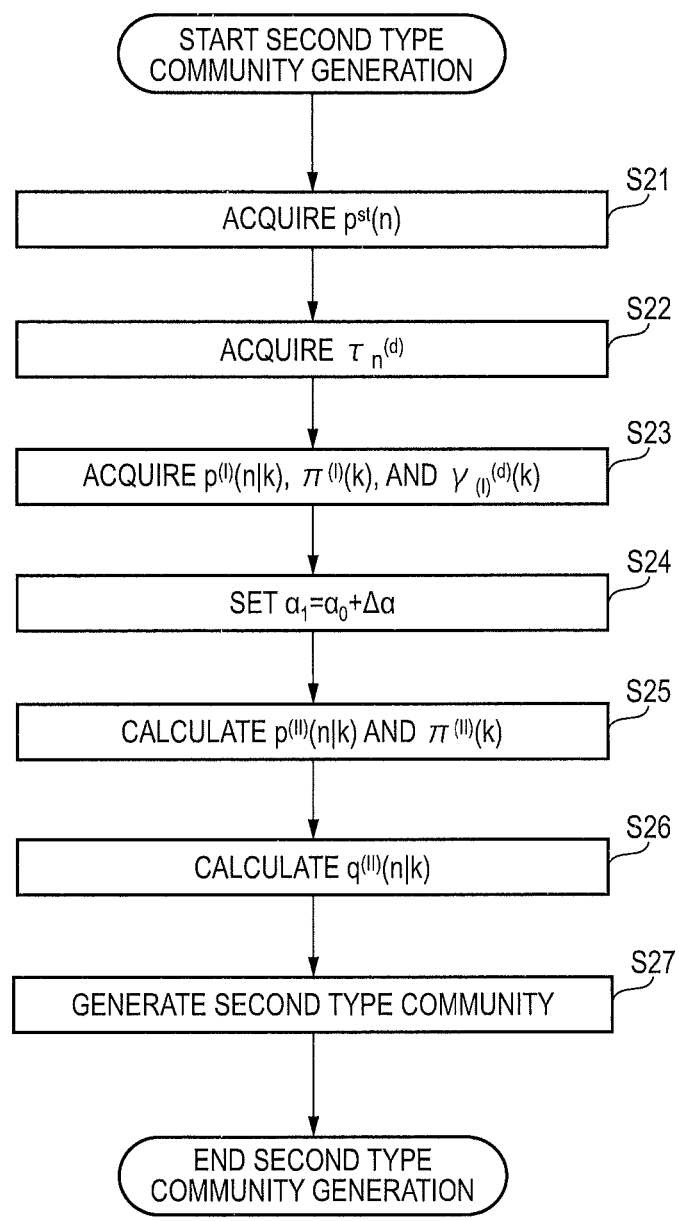
FIG. 4 is a flowchart illustrating the generation of second type communities in the information processing apparatus according to the embodiment of the present invention.

FIG. 4 is a flowchart illustrating the generation of second type communities in the information processing apparatus 1 according to the embodiment of the present invention. The second type community generation unit 132 updates the classification ratio, the importance degree, and the assignment degree so as to have correlation according to the second value $\alpha_1$ of the resolution 12 by setting the classification ratio $p^{(I)}(n|k)$ and the importance degree $\pi^{(I)}(k)$, which are acquired by the first type community generation unit 131 through the sequential computation, as the start points of the calculation and by setting the resolution 12 to the second value $\alpha_1 = \alpha_0 + \Delta\alpha$ which is slightly increased from the first value $\alpha_0$. In addition, the second type community generation unit 132 updates the classification ratio, the importance degree, and the assignment degree, which are updated by the second type community generation unit 132, such that classification ratio, the importance degree, and the assignment degree to have correlation according to the slightly increased resolution 12.

A process of generating the second type communities starts from acquiring a stationary probability distribution $p^{st}(n)$ which is calculated in step S1 of the process of generating the first type communities (S21). In addition, the passage information $\tau_n^{(d)}$, which is generated in step S2 of the process of generating the first type communities, is acquired (S22). Further, the classification ratio $p^{(I)}(n|k)$, the importance degree $\pi^{(I)}(k)$, and the ratio $\gamma_{(I)}^{(d)}(k)$, which are calculated in step S10 of the process of generating the first type communities, are acquired (S23). Here, the ratio $\gamma_{(I)}^{(d)}(k)$ is the value of the ratio $\gamma_t^{(d)}(k)$ in a case in which $|Q_t - Q_{t-1}| < \epsilon$ is established.

The classification ratio updating unit 132a according to the embodiment updates the classification ratio $p^{(I)}(n|k)$, which is related to the target node [n], such that the classification ratio $p^{(I)}(n|k)$ has correlation according to the second value $\alpha_1 = \alpha_0 + \Delta\alpha$ of the resolution 12 with the classification ratio, in which the adjacent nodes are respectively classified as the plurality of communities. Therefore, the second type community generation unit 132 sets the second value $\alpha_1 = \alpha_0 + \Delta\alpha$, which is acquired by increasing the first value $\alpha_0$, as the resolution 12 (S24). In a case of the embodiment, when the resolution 12 becomes coarse, the value of the resolution 12 becomes large. Therefore, the increased amount $\Delta\alpha$ is a positive value. However, when the resolution 12 becomes coarse and the value of the resolution 12 becomes small, $\Delta\alpha$ may be a negative value.

The classification ratio updating unit 132a according to the embodiment sets the second value $\alpha_1 = \alpha_0 + \Delta\alpha$ of the resolution 12 using the variation amount $\Delta\alpha$ in a degree (in a degree of quasi-static variation) in which the variation in the classification ratio or the like is relatively small. For example, the classification ratio updating unit 132a may determine the variation amount $\Delta\alpha$ of the resolution 12 such that a variation in the classification ratio or the like is equal to or less than the value $\epsilon$ which is used to determine the convergence property of the sequential computation in Equation 6, and may set the resolution 12 to the second value $\alpha_1$.

Specifically, the classification ratio updating unit 132a updates the classification ratio using the following Equation 8 (S25). Here, the classification ratio $p^{(II)}(n|k)$ is an updated classification ratio which is used to generate the second type communities. In addition, $D^{(I)}(k) = \Sigma_k \gamma_{(I)}^{(d)}(k)$.

$$p^{(II)}(n|k) = \frac{\alpha_1}{\alpha_1 + 2D^{(I)}(k)} \sum_{m=1}^{N} T_{nm} p^{(I)}(m|k) + \frac{1}{\alpha_1 + 2D^{(I)}(k)} \sum_{d=1}^{D} \gamma_{(I)}^{(d)}(k) \tau_n^{(d)}$$

[Equation 8]

In Equation 8, the first value $\alpha_0$ of the resolution 12 in Equation 3 is replaced by the second value $\alpha_1$, and the classification ratio $p_t(n|k)$ and the ratio $\gamma_t^{(d)}(k)$, which are acquired through the t-th sequential computation, are replaced by the classification ratio $p^{(I)}(n|k)$ and the ratio $\gamma_{(I)}^{(d)}(k)$ which are respectively calculated in a first type community classification process.

In addition, the importance degree updating unit 132b according to the embodiment updates the importance degree $\pi^{(I)}(k)$, which is calculated in the first type community classification process, with $\pi^{(II)}(k)$ which is used to generate the second type communities. Specifically, the importance degree updating unit 132b updates the ratio $\gamma_{(I)}^{(d)}(k)$, which is calculated in the first type community classification process, with ratio $\gamma_{(II)}^{(d)}(k)$ in the following Equation 9.

$$\gamma_{(II)}^{(d)}(k) = \frac{\pi^{(I)}(k) \Pi_{n=1}^{N} (p^{(I)}(n|k))^{\tau_n^{(d)}}}{\Sigma_{j=1}^{K} \left( \pi^{(I)}(j) \Pi_{m=1}^{N} (p^{(I)}(m|j))^{\tau_m^{(d)}} \right)}$$

[Equation 9]

In Equation 9, the classification ratio $p_{t-1}(n|k)$ and the importance degree $\pi_{t-1}(k)$, which are acquired by performing (t−1)-th sequential computation in Equation 4, are replaced by the classification ratio $p^{(I)}(n|k)$ and the importance degree $\pi^{(I)}(k)$ which are calculated in the first type community classification process. The importance degree updating unit 132b updates the importance degree $\pi^{(I)}(k)$, which is calculated by the importance degree calculation unit 131b, with the classification ratio $p^{(II)}(n|k)$ which is updated by the classification ratio updating unit 132a. Specifically, the importance degree updating unit 132b updates the importance degree with the updated ratio $\gamma_{(II)}^{(d)}(k)$ using the following Equation 10 (S25).

$$\pi^{(II)}(k) = \frac{D(k)}{\Sigma_{j=1}^{K} D(j)},$$

$$D(k) = \sum_{d=1}^{D} \gamma_{(II)}^{(d)}(k)$$

[Equation 10]

In Equation 10, the ratio $\gamma_t^{(d)}(k)$, which is acquired by performing the t-th sequential computation in Equation 5, is replaced by the updated ratio $\gamma_{(II)}^{(d)}(k)$.

Further, the assignment degree updating unit 132c updates the assignment degree $q^{(I)}(k|n)$, which is calculated in the first type community classification process, with the assignment degree $q^{(II)}(k|n)$ which is used to generate the second type communities using the following Equation 11 (S26).

$$q^{(II)}(k \mid n) = \frac{\pi^{(II)}(k)p^{(II)}(n \mid k)}{\sum_{j=1}^{K} \pi^{(II)}(j)p^{(II)}(n \mid j)} \quad \text{[Equation 11]}$$

In Equation 11, the classification ratio $p^{(I)}(n|k)$ and the importance degree $\pi^{(I)}(k)$, which are calculated in the first type community classification process of Equation 7, are replaced by the classification ratio $p^{(II)}(n|k)$ and the importance degree $\pi^{(II)}(k)$ which are updated in a second type community classification process.

The second type community generation unit 132 generates one or more second type communities, to which the target node [n] belongs, in the network information 10 based on the classification ratio $p^{(II)}(n|k)$ relevant to the target node [n] which is updated by the classification ratio updating unit 132a (S27). The second type community generation unit 132 may determine the ratio, in which the target node [n] belongs to the community [k], using the value of the classification ratio $p^{(II)}(n|k)$. In addition, the second type community generation unit 132 may generate the second type communities, to which the target node [n] belongs, based on the assignment degree $q^{(II)}(k|n)$ which is calculated based on the classification ratio $p^{(II)}(n|k)$ and the importance degree $\pi^{(II)}(k)$. In this case, the ratio, in which the target node [n] belongs to the community [k], is determined using the value of the assignment degree $q^{(II)}(k|n)$. In all cases, the second type community generation unit 132 generates two or more second type communities to which the target node [n] belongs. Therefore, in the second type community generation unit 132 according to the embodiment, community classification, which expresses that one node includes a plurality of attributes, is performed.

In addition, in the first type community generation unit 131 and the second type community generation unit 132 according to the embodiment, the process of generating the second type communities is performed while the classification ratio $p^{(I)}(n|k)$, the importance degree $\pi^{(I)}(k)$ and the ratio $\gamma_{(I)}^{(d)}(k)$, which are calculated in the process of generating the first type communities, are assumed as the start points of the calculation, and the relationship between communities, acquired using two or more resolutions (the first value $\pi_0$ and the second value $\pi_1$ of the resolution 12), is derived. In addition, the convergence property of the sequential computation is determined by the first type community generation unit 131 and the calculation result, which is acquired by the first type community generation unit 131, is used in the second type community generation unit 132. Therefore, communities, which are acquired through classification with a sufficient precision, are updated, and thus communities are generated for the two or more resolutions with small calculation amount, compared to a case in which communities are independently generated for two or more resolutions. In the embodiment, the second type community generation unit 132 updates the classification ratio, the ratio, and the importance degree by performing one calculation using Equations 8, 9, and 10. However, the values may be updated by performing several times of sequential computation (sequential computation corresponding the number, which is less than the number of times of the sequential computation, performed by the classification ratio calculation unit 131a and the importance degree calculation unit 131b). The communities are generated by the first type community generation unit 131 with a sufficient precision. Therefore, when the number of times of the sequential computation performed in the second type community generation unit 132 is smaller than the number of times of the sequential computation performed in the first type community generation unit 131, the communities are generated by the second type community generation unit 132 with a sufficient precision.

In the above description, the second type community generation unit 132 inputs the classification ratio $p^{(I)}(n|k)$, the importance degree $\pi^{(I)}(k)$ and the ratio $\gamma_{(I)}^{(d)}(k)$, which are calculated in the process of generating the first type communities, and the second value $\alpha_1 = \alpha_0 + \Delta\alpha$ of the resolution 12, and calculates the updated classification ratio $p^{(II)}(n|k)$, the importance degree $\pi^{(II)}(k)$, the ratio $\gamma_{(II)}^{(d)}(k)$, and the assignment degree $q^{(II)}(k|n)$. Further, the second type community generation unit 132 inputs the classification ratio $p^{(II)}(n|k)$, the importance degree $\pi^{(II)}(k)$ and the ratio $\gamma_{(II)}^{(d)}(k)$, which are calculated in the process of generating the second type communities, and the third value $\alpha_0 + 2\Delta\alpha$ of the resolution 12, and calculates the updated classification ratio, the importance degree, the ratio, and the assignment degree. In this manner, when the classification ratio, the importance degree, the ratio, and the assignment degree are updated by increasing the value of the resolution 12 by $\Delta\alpha$, the variation in community formation states for the values of the resolution 12 is tracked. A subsequent drawing shows the shape of the variation in the importance degree $\pi^{(II)}(k)$ when the value of the resolution 12 increases from the first value $\alpha_0$.

Figure 5:
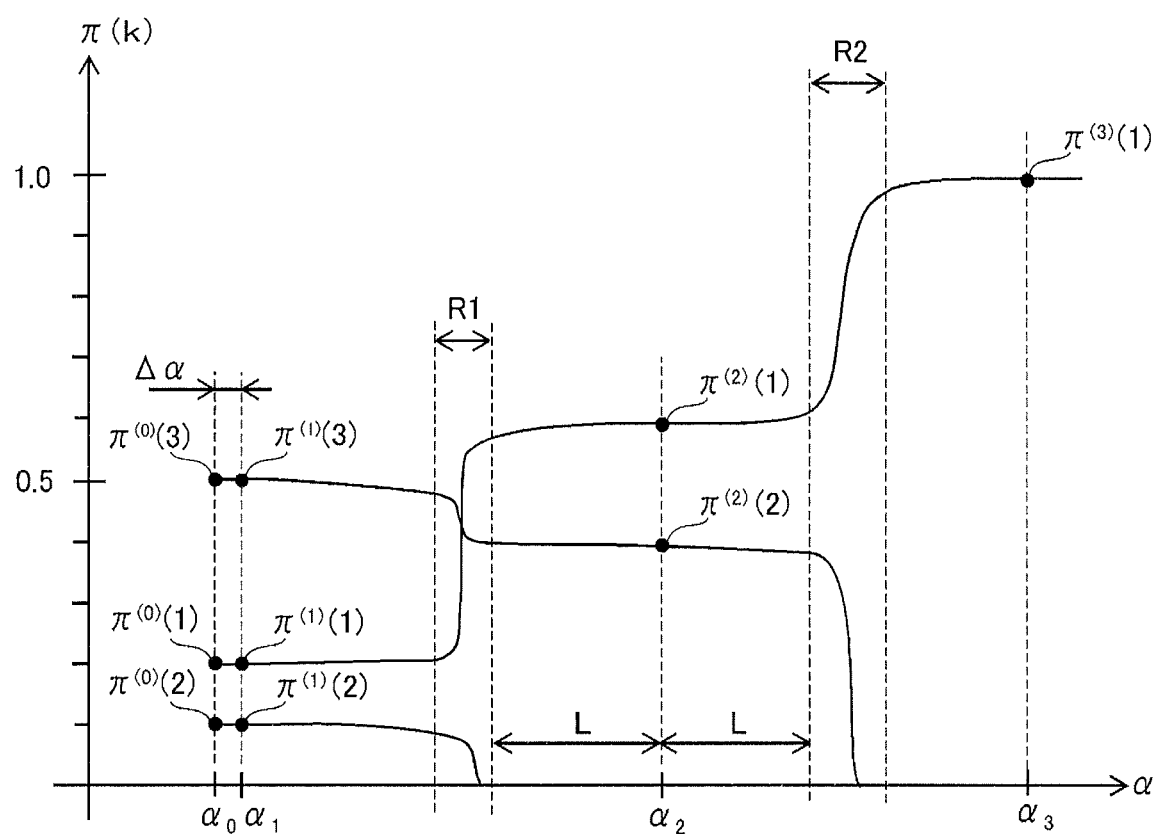
FIG. 5 is a graph illustrating the relationship between an importance degree and resolution which are calculated by the information processing apparatus according to the embodiment of the present invention.

FIG. 5 is a graph illustrating the relationship between the importance degree $\pi(k)$ and the resolution 12 which are calculated by the information processing apparatus 1 according to the embodiment of the present invention. In the drawing, a horizontal axis indicates the value of the resolution $12\alpha$ and a vertical axis indicates the value of the importance degree $\pi(k)$.

Three data points, which are the closest in the vertical axis of the drawing, indicate the value of the importance degree $\pi^{(0)}(k)$, which is calculated by the importance degree calculation unit 131b, when the value of the resolution 12 is the first value $\alpha_0$ for the network information 10 illustrated in FIG. 2. Here, the importance degree $\pi^{(0)}(k)$ is the importance degree of the first type communities, and the index is updated with (0) and is set to an index corresponding to the first value $\alpha_0$ of the resolution 12.

The importance degree $\pi^{(0)}(k)$ has values, which are not 0, for k=1, 2, and 3, and has a value of 0 for the other K. This indicates that, when community classification is performed on the network information 10 so as to have correlation according to the first value $\alpha_0$ of the resolution 12, the importance degree is classified as three first type communities.

In the drawing, when the resolution 12 is changed from the first value $\alpha_0$ to the second value $\alpha_1$ by increasing $\Delta\alpha$, the value of the importance degree $\pi^{(1)}(k)$, which is calculated by the importance degree updating unit 132b, is expressed. Here, the importance degree $\pi^{(1)}(k)$ is the importance degree of the second type communities, and the index is changed into (1) and is set to the index corresponding to the second value $\alpha_1$ of the resolution 12. The importance degree $\pi^{(1)}(k)$ has values, which are substantially the same as the importance degree $\pi^{(0)}(k)$, for the k=1, 2, and 3.

The inventors of the present invention found that, when the importance degree is repeatedly updated by the second type community generation unit 132 by increasing the value of the resolution 12, an unstable area, in which the value of the importance degree π(k) varies relatively largely, appears, and thus the value of the importance degree becomes 0 for one or more communities. In a case of the drawing, when the value of the resolution 12 increases, a first unstable area R1 appears, and the value of the π(k=2) varies to 0. In addition, in the first unstable area R1, replacement from π(k=1)<π(k=2) to π(k=1)>π(k=2) occurs. It is interpreted that the variations occur because, when the when the resolution 12 is caused to be coarse by increasing the value of the resolution 12, the community [2] is vanished and absorbed into the community [1], and thus the importance degree of the relatively community [3] is reduced.

The importance degree variation calculation unit 132d according to the embodiment calculates the amount of variation, acquired before and after updating, of the importance degree which is updated by the importance degree updating unit 132b. That is, the importance degree variation calculation unit 132d calculates the amount of variation in two importance degrees, which are calculated when the value of the resolution is different by $\Delta\alpha$, for each of the communities.

In addition, the importance degree variation determination unit 132e according to the embodiment determines whether or not the amount of variation, which is calculated by the importance degree variation calculation unit 132d, is larger than the predetermined amount. The amount of variation in the importance degrees in the stable areas (areas other than the unstable area) may be used as the predetermined amount (reference amount). In a case of the example of FIG. 5, it is possible to set the variation amount for the community [k], which has the largest value in $|\pi^{(1)}(k)-\pi^{(0)}(k)|$, to the reference amount.

The importance degree variation calculation unit 132d calculates the variation amount of π(1), π(2), and π(3) when the value of the resolution 12 increases by $\Delta\alpha$. Since each of the variation amounts is larger than the reference amount in the first unstable area R1, the importance degree variation determination unit 132e determines that the amount of variation in π(1), π(2), and π(3) is larger than a predetermined amount.

The resolution acquisition unit 132f according to the embodiment acquires the value of the resolution 12 when it is determined that the amount of variation in the importance degree is larger than the predetermined amount by the importance degree variation determination unit 132e. In a case of the example, the importance degree variation determination unit 132e determines that the amount of variation in the importance degree is larger than the predetermined amount in the first unstable area R1, and thus the resolution acquisition unit 132f acquires the value of the resolution 12 which belongs to the first unstable area R1. The resolution acquisition unit 132f may acquire the value of the middle point of the value of the resolution 12 which belongs to the first unstable area R1. Therefore, the value of the resolution 12, which causes a hierarchy to appear in communities, is determined.

When the value of the resolution 12 is further increased and the value of the importance degree is continuously updated, the value of the importance degree, acquired when the value of the resolution 12 is $\alpha_2$, is $\pi^{(2)}(k)$. Further, when the importance degree is continuously updated, a second unstable area R2 appears. In the second unstable area R2, the importance degree of the community [2] is 0, and the importance degree of the community [1] is close to 1. It is interpreted that the community [2] is vanished and is absorbed into the community [1], thereby being one community as a whole. When the value of the importance degree is continuously updated after the second unstable area R2 is passed, the value of the importance degree, acquired when the value of the resolution 12 is $\alpha_3$, is $\pi^{(3)}(k)$.

The stable resolution calculation unit 132g according to the embodiment calculates a stable resolution which has values between the values of the two resolutions 12 which are acquired by the resolution acquisition unit 132f. Specifically, the stable resolution calculation unit 132g calculates the value of the middle point of the values of the two resolutions 12, which are acquired by the resolution acquisition unit 132f, as the stable resolution. In the example of FIG. 5, the stable resolution calculation unit 132g calculates the value of the middle point between the upper end of the first unstable area R1 and the lower end of the second unstable area R2 as the stable resolution $\alpha_2$. The calculated stable resolution is used to calculate the dependence degree between communities by the dependence degree calculation unit 133 which will be described later in detail. If the dependence degree between communities is calculated in the unstable area, there is a case in which the calculation result is unstable, calculation time is long, or the precision of the calculation result is bad. The dependence degree calculation unit 133 according to the embodiment calculates the dependence degree using the stable resolution, thereby acquiring the stable calculation result. In addition, the stable resolution calculation unit 132g according to the embodiment uses the value of the middle point of the values of the two resolutions 12, which are acquired by the resolution acquisition unit 132f, as the stable resolution, thereby acquiring the resolution in which the stable calculation result is acquired, with a small amount of calculation.

In the description below, three communities, which are acquired when the value of the importance degree is $\pi^{(1)}(k)$, are referred to as first hierarchy communities, two communities, which are acquired when the value of the importance degree is $\pi^{(2)}(k)$, are referred to as second hierarchy communities, and one community, which is acquired when the value of the importance degree is $\pi^{(3)}(k)$, is referred to as a third hierarchy community. The second hierarchy communities are upper layer communities for the first hierarchy communities. In contrast, the first hierarchy communities are lower layer communities for the second hierarchy communities. In the same manner, the third hierarchy community is the upper layer community for the second hierarchy communities, and the second hierarchy communities are lower layer communities for the third hierarchy community.

Figure 6:
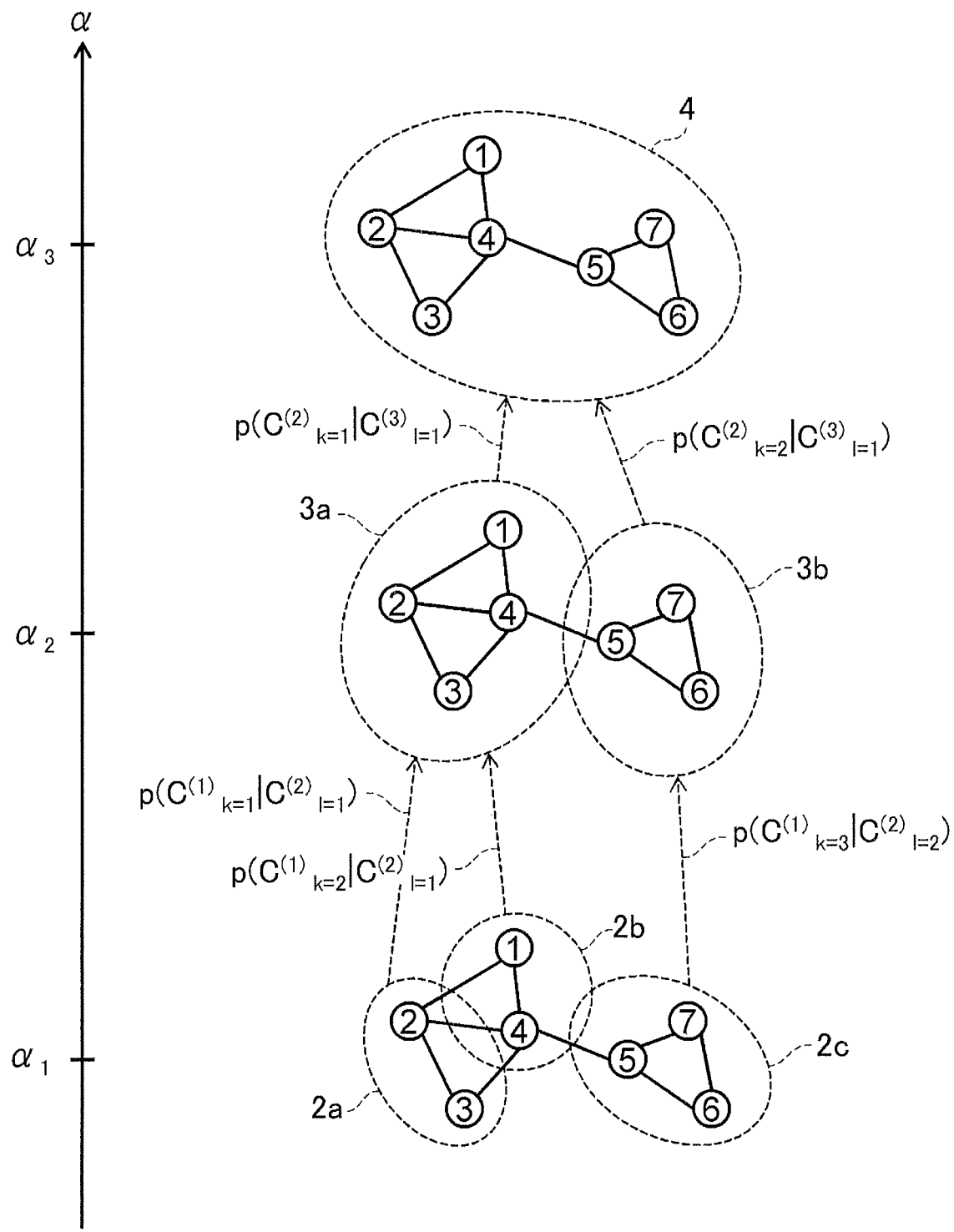
FIG. 6 is a schematic diagram illustrating hierarchy of the communities, which is generated by the information processing apparatus, according to the embodiment of the present invention.

FIG. 6 is a schematic diagram illustrating the hierarchy of the communities which are generated by the information processing apparatus 1 according to the embodiment of the present invention. In the drawing, a vertical axis, which expresses the value of the resolution 12, is shown, and the communities of the network information 10, acquired when the values of the resolutions 12 are $\alpha_1$, $\alpha_2$, and $\alpha_3$, are shown by dotted lines. When the value of the resolution 12 is $\alpha_1$, a first-first hierarchy community 2a, which includes nodes [2] and [3], a second-first hierarchy community 2b, which includes nodes [1] and [4], and a third-first hierarchy community 2c, which includes nodes [5], [6] and [7] are expressed by dotted lines. In addition, when the value of the resolution 12 is $\alpha_2$, a first-second hierarchy community 3a, which includes nodes [1], [2], [3] and [4], and a second-second hierarchy community 3b, which includes nodes [5], [6] and [7], are expressed by dotted lines. In addition, when the value of the resolution 12 is $\alpha_3$, a third hierarchy community 4, which includes nodes [1] to [7], is expressed by a dotted line.

A dependence degree $p(C^{(a)}_k|C^{(b)}_l)$ is expressed between the respective hierarchical communities using a dotted line arrow. Here, $C^{(a)}_k$ is a symbol which indicates an a-th hierarchical community [k], and the dependence degree $p(C^{(a)}_k|C^{(b)}_l)$ indicates a ratio in which the a-th hierarchical community [k] depends on a b-th hierarchical community [l]. The dependence degree calculation unit 133 according to the embodiment calculates the dependence degree, which indicates a ratio in which one upper layer community of the one or more second-type communities depends on one lower layer community of one or more first-type communities, such that the dependence degree becomes large as there are many redundancies between one or more nodes which are classified as the upper layer communities and one or more nodes which are classified as the lower layer communities.

Figure 7:
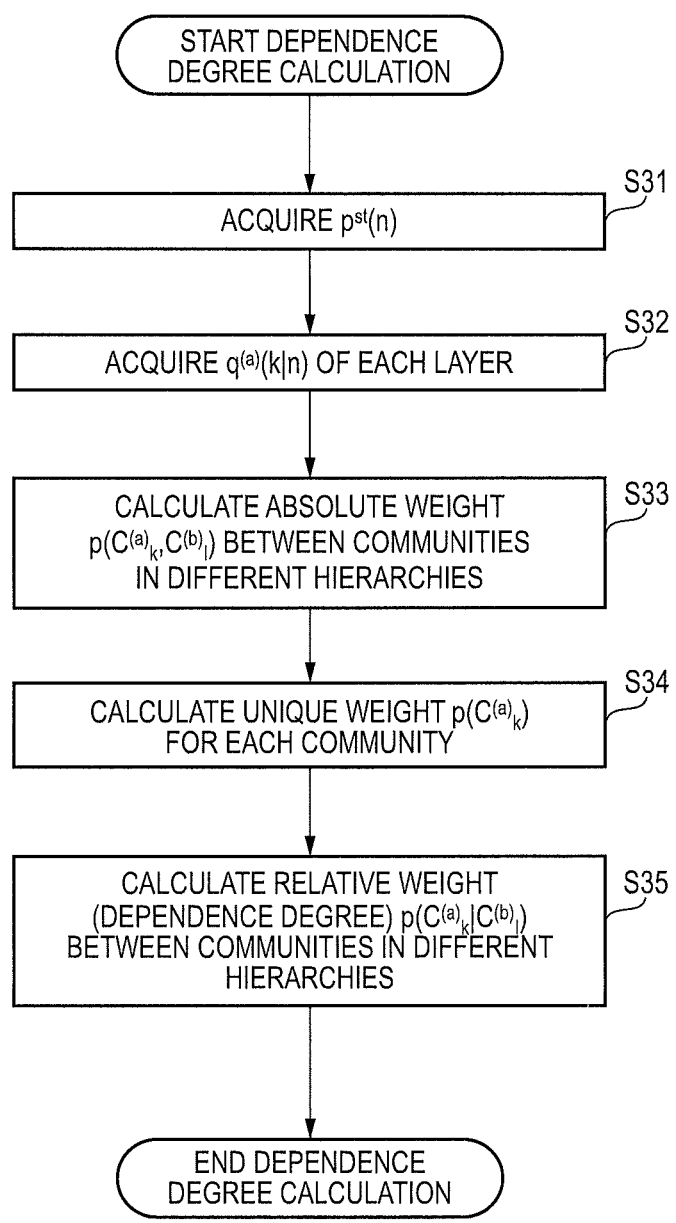
FIG. 7 is a flowchart for calculating the dependence degree in the information processing apparatus according to the embodiment of the present invention.

FIG. 7 is a flowchart for calculating the dependence degree in the information processing apparatus 1 according to the embodiment of the present invention. The dependence degree calculation unit 133 according to the embodiment first acquires the stationary probability distribution $p^{st}(n)$ which is calculated by the first type community generation unit 131 (S31). Further, each hierarchical assignment degree $q^{(a)}(k|n)$, which is calculated by the assignment degree updating unit 132c of the second type community generation unit 132, is acquired (S32). It is preferable that each hierarchical assignment degree $q^{(a)}(k|n)$ is acquired based on the classification ratio and the importance degree which are calculated under the stable resolution.

Thereafter, the dependence degree calculation unit 133 calculates an absolute weight $p(C^{(a)}_k, C^{(b)}_l)$ between the a-th hierarchical community [k] and the b-th hierarchical community [l] (S33). The dependence degree calculation unit 133 according to the embodiment calculates the absolute weight $p(C^{(a)}_k, C^{(b)}_l)$ using the following Equation 12.

$$p(C^{(a)}_k, C^{(b)}_l) = \sum_{n=1}^{N} p^{st}(n) I(n \in C^{(a)}_k) I(n \in C^{(b)}_l) \qquad \text{[Equation 12]}$$

Here, $I(n \in C^{(a)}_k)$ is a function which is 1 when the node [n] belongs to the a-th hierarchical community [k] and which is 0 when the node [n] does not belong to the a-th hierarchical community [k]. Whether or not the node [n] belongs to the a-th hierarchical community [k] is determined based on an a-th hierarchical assignment degree $q^{(a)}(k|n)$. Since the assignment degree $q^{(a)}(k|n)$ satisfies $\Sigma_k q^{(a)}(k|n)=1$ with regard to an arbitrary node [n], a community, which has the highest assignment degree, exists (when a plurality of communities temporarily have the highest assignment degree with the same value, one community of the plurality of communities may be randomly selected). The dependence degree calculation unit 133 according to the embodiment determines that the node [n] belongs to the community [k] in which the value of the assignment degree $q^{(a)}(k|n)$ is the largest in the a-th hierarchy.

Subsequently, the dependence degree calculation unit 133 calculates a unique weight $p(C^{(a)}_k)$ for the a-th hierarchical community [k] (S34). The dependence degree calculation unit 133 according to the embodiment calculates the unique weight $p(C^{(a)}_k)$ of the a-th hierarchical community [k] using the following Equation 13.

$$p(C^{(a)}_k) = \sum_{n=1}^{N} p^{st}(n) I(n \in C^{(a)}_k) \qquad \text{[Equation 13]}$$

A first method for calculating the above-described absolute weight $p(C^{(a)}_k, C^{(b)}_l)$ and the unique weight $p(C^{(a)}_k)$ is an example, and there are other methods for calculating the absolute weight and the unique weight. A second method and a third method for calculating the absolute weight and the unique weight will be described later in detail.

Based on the absolute weight $p(C^{(a)}_k, C^{(b)}_l)$ and the unique weight $p(C^{(a)}_k)$, the dependence degree calculation unit 133 calculates the relative weight (dependence degree) $p(C^{(a)}_k|C^{(b)}_l)$ between the a-th hierarchical community [k] and the b-th hierarchical community [l] (S35). The dependence degree calculation unit 133 according to the embodiment calculates the dependence degree $p(C^{(a)}_k|C^{(b)}_l)$, which is a ratio in which the a-th hierarchical community [k] depends on the b-th hierarchical community [l], using the following Equation 14.

$$p(C^{(a)}_k | C^{(b)}_l) = \frac{p(C^{(a)}_k, C^{(b)}_l)}{p(C^{(b)}_l)} \qquad \text{[Equation 14]}$$

FIG. 8 is a table illustrating the dependence degree $p(C^{(1)}_k|C^{(2)}_l)$ between the first hierarchical communities and the second hierarchical communities, which is calculated by the information processing apparatus 1 according to the embodiment of the present invention. In addition, FIG. 9 is a table illustrating the dependence degree $p(C^{(2)}_k|C^{(3)}_l)$ between the second hierarchical communities and the third hierarchical community, which is calculated by the information processing apparatus 1 according to the embodiment of the present invention. Both drawings illustrate the absolute weights $p(C^{(1)}_k, C^{(2)}_l)$ and $p(C^{(2)}_k, C^{(3)}_l)$ and the unique weights $p(C^{(2)}_k)$ and $p(C^{(3)}_k)$.

When community classification is performed on the network information 10, which is illustrated in FIG. 2, using the value $\alpha_1$ of the resolution 12, three first hierarchical communities are detected. The community, which has the highest first hierarchical assignment degree $q^{(1)}(k|n)$ for the nodes [2] and [3], is the community [1]. Therefore, $I([2] \in C^{(1)}_k) = \{1 \text{ (when k=1), 0 (when k=2 and 3)}\}$ and $I([3] \in C^{(1)}_k) = \{1 \text{ (when k=1), 0 (when k=2 and 3)}\}$. In the same manner, $I([1, 4] \in C^{(1)}_k) = \{1 \text{ (when k=2), 0 (when k=1 and 3)}\}$. In addition, $I([5 \text{ to } 7] \in C^{(1)}_k) = \{3 \text{ (when k=1), 0 (when k=1 and 2)}\}$.

In addition, $I([1 \text{ to } 4] \in C^{(2)}_k) = \{1 \text{ (when k=1), 0 (when k=2)}\}$ and $I([5 \text{ to } 7] \in C^{(2)}_k) = \{1 \text{ (when k=2), 0 (when k=1)}\}$ based on the second hierarchical assignment degree $q^{(2)}(k|n)$.

When the absolute weight $p(C^{(1)}_k, C^{(2)}_l)$ is calculated using Equation 12 based on $I(n \in C^{(1)}_k)$ and $I(n \in C^{(2)}_k)$ and the acquired stationary probability distribution $p^{st}(n)$, values illustrated in the left table of FIG. 8 are acquired. The absolute weight $p(C^{(1)}_k, C^{(2)}_l)$ satisfies $\Sigma_{K,l} p(C^{(1)}_k, C^{(2)}_l)=1$. Based on the values, it is understood that the first hierarchical communities [1] and [2] are related to the second hierarchical community [1] but is not related to the second hierarchical community [2]. In addition, it is understood that the first hierarchical community [3] is not related to the second hierarchical community [1] but is related to the second hierarchical community [2].

When the unique weight $p(C^{(2)}_k)$ of the second hierarchical communitis is calculated according to Equation 13 based on $I(n \in C^{(2)}_k)$ and the acquired stationary probability distribution $p^{st}(n)$, values in a central table in FIG. 8 are acquired. The unique weight $p(C^{(2)}_k)$ satisfies the unique weight $\Sigma_k p(C^{(2)}_k)=1$. In the second hierarchy, a fact that the community [1] is relatively larger than the community [2] is read based on the value.

When the dependence degree $p(C^{(1)}_k|C^{(2)}_l)$ between the first hierarchical communities and the second hierarchical communities is calculated according to Equation 14 based on the calculated absolute weight $p(C^{(1)}_k,C^{(2)}_l)$ and the unique weight $p(C^{(2)}_k)$, values in a right table in FIG. 8 are acquired. The dependence degree $p(C^{(1)}_k|C^{(2)}_l)$ satisfies $\Sigma_k p(C^{(1)}_k|C^{(2)}_l)=1$ for each of the second hierarchical communities (for arbitrary 1). Based on the values, it is understood that the first hierarchical communities [1] and [2] depend on the second hierarchical community [1] but does not depend on the second hierarchical community [2]. In addition, it is understood that a ratio in which the first hierarchical community [1] depends on the second hierarchical community [1] is 0.523, that a ratio in which the first hierarchical community [2] depends on the second hierarchical community [1] is 0.477, and that the first hierarchical community [1] has a slightly larger dependence degree. In addition, the first hierarchical community [3] depends on the second hierarchical community [2] but does not depend on the second hierarchical community [1].

In the same manner, FIG. 9 illustrates the absolute weight $p(C^{(2)}_k,C^{(3)}_l)$, the unique weight $p(C^{(3)}_k)$, and the dependence degree $p(C^{(2)}_k|C^{(3)}_l)$ for two second hierarchical communities and one third hierarchical community, respectively, in tables. Since only one community exists in the third hierarchy, each of the second hierarchical communities depends on the third hierarchical community [1]. However, the dependent ratio is 0.62 for the second hierarchical community [1] and 0.38 for the second hierarchical community [2], and thus it is understood that there is deviation.

In the dependence degree calculation unit 133 according to the embodiment, the parent-child relationship between the upper layer community and the lower layer community, which reflects absorption of the communities, for the different hierarchical communities in the network information 10 is calculated. The community is not limited to essentially have a pair of parent-child relationship, and there is a case in which two or more communities are integrated to one community and form the parent-child relationship. In the example illustrated in FIG. 6, it may be said that first hierarchical communities [1] and [2] are integrated with the second hierarchical community [1], and the second hierarchical community [1] has two communities as parents. As above, in the dependence degree calculation unit 133 according to the embodiment, a community, which has two or more communities as parents, is determined, and the more detail parent-child relationship between the communities is derived.

In below, the second method and the third method for calculating the absolute weight $p(C^{(a)}_k,C^{(b)}_l)$ between the a-th hierarchical community [k] and the b-th hierarchical community [l] and the unique weight $p(C^{(a)}_k)$ of the a-th hierarchical community [k] will be described. In the second method, the number of communities to which the node [n] belongs is not determined to 1, it is permitted that one node belongs to a plurality of communities, and the amount thereof is acquired. The third method is a method for acquiring the amount when links have directions.

In the second method, the absolute weight $p(C^{(a)}_k,C^{(b)}_l)$ between the a-th hierarchical community [k] and the b-th hierarchical community [l] is acquired using the following Equation 15.

$$p(C^{(a)}_k, C^{(b)}_l) = \sum_{n=1}^{N} S^{(a),(b)}_{k,l}(n) q^{(b)}(l|n) p^{st}(n) \quad \text{[Equation 15]}$$

Here, $S^{(a),(b)}_{k,l}(n)$ is acquired through the sequential computation using the following Equation 16. Here, $K_a$ is the total number of the a-th hierarchical communities, and $K_b$ is the total number of the b-th hierarchical communities.

$$\rho^{(a),(b)}_{k,l}(n) = \sum_{i=1}^{K_a} q^{(a)}(i|n) \frac{S^{(a),(b)}_{k,l}(n) q^{(b)}(l|n)}{\sum_{j=1}^{K_b} S^{(a),(b)}_{i,j}(n) q^{(b)}(j|n)}, \quad \text{[Equation 16]}$$

$$S^{(a),(b)}_{k,l}(n) = \frac{\rho^{(a),(b)}_{k,l}(n)}{\sum_{i=1}^{K_a} \rho^{(a),(b)}_{i,l}(n)}$$

When $S^{(a),(b)}_{k,l}(n)$ is acquired, the value of $S^{(a),(b)}_{k,l}(n)$ is temporarily determined first. Thereafter, $\rho^{(a),(b)}_{k,l}(n)$ is calculated using Equation 16 with the temporarily determined $S^{(a),(b)}_{k,l}(n)$, and the a-th hierarchical assignment degree $q^{(a)}(k|n)$ and b-th hierarchical assignment degree $q^{(b)}(k|n)$ which are calculated by the assignment degree updating unit 132c. Further, the value of the $S^{(a),(b)}_{k,l}(n)$ is updated using Equation 16 with the calculated $\rho^{(a),(b)}_{k,l}(n)$. Calculation below is repeated until the variation in the value of the $S^{(a),(b)}_{k,l}(n)$ is sufficiently small. The convergence property of the value of $S^{(a),(b)}_{k,l}(n)$ may be determined according to whether or not the variation in the value of $S^{(a),(b)}_{k,l}(n)$, acquired before and after the sequential computation, is equal to or less than ε in Equation 6.

In the second method, the unique weight $p(C^{(a)}_k)$ of the a-th hierarchical community [k] is acquired using the following Equation 17.

$$p(C^{(a)}_k) = \sum_{n=1}^{N} p^{st}(n) q^{(a)}(k|n) \quad \text{[Equation 17]}$$

In the first method, based on the absolute weight $p(C^{(a)}_k,C^{(b)}_l)$ calculated using Equation 15 and the unique weight $p(C^{(a)}_k)$ calculated using Equation 16, the relative weight (dependence degree) $p(C^{(a)}_k|C^{(b)}_l)$ between the a-th hierarchical community [k] and the b-th hierarchical community [l] is calculated using Equation 14. The feature of the first method is to derive the parent-child relationship between the communities when one node belongs to a plurality of communities. Therefore, the upper layer community potentially has all the lower layer communities as parents.

Subsequently, the third method for acquiring the dependence degree will be described. The third method is applied when a link, in which the network information 10 has a direction, is included. In the example of the network information 10 illustrated in FIG. 2, links have not directions. However, all the links are respectively replaced by two links which have opposite directions, and thus it is possible to apply the third method. In the example of the network information 10 illustrated in FIG. 2, the total number of links is 9. However, when all the links are replaced by directional links, the total number of links is 18.

In the third method, the absolute weight $p(C^{(a)}{}_k, C^{(b)}{}_{k'})$ between the a-th hierarchical community [k] and a b-th hierarchical community [k'] is acquired using the following Equation 18. Here, p~(I) is the probability distribution of links which are included in the network information 10, and is applied to Equation 19. In addition, L is the total number of links which are included in the network information 10. $I(I \in C^{(a)}{}_k)$ is a function which is 1 when the link [I] belongs to the a-th hierarchical community [k] and which is 0 when the link [I] does not belong to the a-th hierarchical community [k]. $I(I \in C^{(a)}{}_k)$ may be called a function of expressing whether or not the link [I] belongs to the community [k].

$$p(C_k^{(a)}, C_{k'}^{(b)}) = \sum_{l=1}^{L} \tilde{p}(l) I(l \in C_k^{(a)}) I(l \in C_{k'}^{(b)}) \quad \text{[Equation 18]}$$

The detailed formula of p~(I) is given in the following Equation 19. P~(I) is a value which is acquired by dividing the stationary probability distribution $p^{st}(n_I)$ of the start node $[n_I]$ of the link [I] by the number of links $d^{out}(n_I)$ which starts from the node $[n_I]$. Here, the start node $[n_I]$ indicates a node on the start side of the two nodes which are connected by the link [I]. p~(I) is acquired by dividing the stationary probability distribution of the node by the number of links which are connected to the node, and satisfies $\Sigma_I p^\sim(I)=1$.

$$\tilde{p}(l) = \frac{p^{st}(n_l)}{d^{out}(n_l)} \quad \text{[Equation 19]}$$

In the third method, the unique weight $p(C^{(a)}{}_k)$ of the a-th hierarchical community [k] is acquired using the following Equation 20.

$$p(C_k^{(a)}) = \sum_{l=1}^{L} \tilde{p}(l) I(l \in C_k^{(a)}) \quad \text{[Equation 20]}$$

Based on the absolute weight $p(C^{(a)}{}_k, C^{(b)}{}_{k'})$ calculated using Equation 18 and the unique weight $p(C^{(a)}{}_k)$ calculated using Equation 20, the relative weight (dependence degree) $p(C^{(a)}{}_k | C^{(b)}{}_{k'})$ between the a-th hierarchical community [k] and the b-th hierarchical community [k'] is calculated using Equation 14 in the third method. The feature of the third method is to pay attention to the directional links included in the network information 10, and to calculate the parent-child relationship of communities from the point of view related to the communities to which the links belongs. Therefore, the parent-child relationship of the communities between different hierarchies is derived according to the connection state of the links which are included in the network information 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor programmed to:
     acquire network information which includes target nodes and adjacent nodes which are connected through links;
     calculate a classification ratio for the target node with respect to each of a predetermined number of communities in which the target node is classified, so as to have correlation according to given resolutions with a classification ratio for the adjacent nodes with respect to each of the communities in which the adjacent nodes are classified;
     generate one or more first type communities in the network information, the target nodes belonging to the one or more first type communities, based on the classification ratio for the target nodes which is calculated according to a first value of the resolutions;
     update the classification ratio relevant to the target nodes so as to have correlation according to a second value of the resolutions with the classification ratio in which the adjacent nodes are respectively classified as the plurality of communities;
     generate one or more second type communities in the network information, the target nodes belonging to the one or more second type communities, based on the updated classification ratio for the target nodes;
     calculate an importance degree of one community of the plurality of communities using the calculated classification ratio such that the importance degree becomes high as a ratio which one community occupies to the entirety of the plurality of communities is high;
     update the calculated importance degree using the updated classification ratio;
     calculate an amount of variation in the updated importance degree acquired before and after updating; and
     determine whether or not the calculated amount of variation is larger than a predetermined amount;
     calculate a dependence degree indicative of a ratio, in which one upper layer community of the one or more second type communities depends on one lower layer community of the one or more first type communities, such that the dependence degree becomes large as there are many redundancies between the one or more nodes which are classified as the upper layer community and the one or more nodes which are classified as the lower layer community;
     acquire the values of the resolutions when the processor determines that the amount of variation in the importance degree acquired before and after updating is larger than a predetermined amount;
     calculate a stable resolution which has a value between the two values of the resolutions which are acquired by the processor; and
     calculate the dependence degree using the stable resolution.

2. The information processing apparatus according to claim 1, wherein the processor calculates a value of a middle point of the two values of the resolutions, which are acquired by the processor, as the stable resolution.

3. The information processing apparatus according to claim 1, wherein
the processor calculates the classification ratio through sequential computation, and
the processor updates a first classification ratio with a second classification ratio through a smaller number of sequential computations than a number of sequential computations performed by the processor when calculating the classification ratio.

4. The information processing apparatus according to claim 1, wherein
the processor is further programmed to:
before updating is performed, determine whether or not at least one of the one or more first type communities includes two or more independent parts; and
when the processor determines that at least one of the one or more first type communities includes the two or more independent parts, correct the one or more first type communities such that the two or more independent parts become two or more first type communities.

5. The information processing apparatus according to claim 1, wherein
the processor generates the two or more first type communities and the two or more second type communities.

6. A non-transitory computer readable medium storing a program causing a computer to:
acquire network information which includes target nodes and adjacent nodes which are connected through links;
calculate a classification ratio for the target node with respect to each of a predetermined number of communities in which the target node is classified, so as to have correlation according to given resolutions with a classification ratio for the adjacent nodes with respect to each of the communities in which the adjacent nodes are classified;
generate one or more first type communities in the network information, the target nodes belonging to the one or more first type communities, based on the classification ratio for the target nodes which is calculated according to a first value of the resolutions;
update the classification ratio relevant to the target nodes so as to have correlation according to a second value of the resolutions with the classification ratio in which the adjacent nodes are respectively classified as the plurality of communities;
generate one or more second type communities in the network information, the target nodes belonging to the one or more second type communities, based on the updated classification ratio for the target nodes;
calculate an importance degree of one community of the plurality of communities using the calculated classification ratio such that the importance degree becomes high as a ratio which one community occupies to the entirety of the plurality of communities is high;
update the calculated importance degree using the updated classification ratio;
calculate an amount of variation in the updated importance degree acquired before and after updating;
determine whether or not the calculated amount of variation is larger than a predetermined amount;
calculate a dependence degree indicative of a ratio, in which one upper layer community of the one or more second type communities depends on one lower layer community of the one or more first type communities, such that the dependence degree becomes large as there are many redundancies between the one or more nodes which are classified as the upper layer community and the one or more nodes which are classified as the lower layer community;
acquire the values of the resolutions when the processor determines that the amount of variation in the importance degree acquired before and after updating is larger than a predetermined amount;
calculate a stable resolution which has a value between the two values of the resolutions which are acquired by the processor; and
calculate the dependence degree using the stable resolution.

* * * * *